United States Patent
Bolshinsky et al.

(10) Patent No.: US 10,423,615 B2
(45) Date of Patent: *Sep. 24, 2019

(54) GENERATING MULTILINGUAL QUERIES

(71) Applicant: International Business Machines Corporation, Armonk, NY (US)

(72) Inventors: Leonid Bolshinsky, Karmiel (IL); Vladimir Gamaley, Rehovot (IL); Sharon Krisher, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 214 days.

This patent is subject to a terminal disclaimer.

(21) Appl. No.: 15/178,613

(22) Filed: Jun. 10, 2016

(65) Prior Publication Data
US 2016/0328468 A1    Nov. 10, 2016

Related U.S. Application Data

(63) Continuation of application No. 14/707,108, filed on May 8, 2015.

(51) Int. Cl.
*G06F 17/00*    (2019.01)
*G06F 17/30*    (2006.01)
(Continued)

(52) U.S. Cl.
CPC ...... *G06F 16/24522* (2019.01); *G06F 16/243* (2019.01)

(58) Field of Classification Search
CPC ........................ G06F 17/3043; G06F 17/30401
(Continued)

(56) References Cited

U.S. PATENT DOCUMENTS 7,890,493 B2   2/2011 Chen
8,375,025 B1   2/2013 Datar et al.
(Continued)

OTHER PUBLICATIONS

Mell et al., "The NIST Definition of Cloud Computing", Recommendationsof theNational Institute of Standards and Technology, NIST Special Publication 800-145, Computer Security DivisionInformation Technology Laboratory, National Institute of Standards and Technology, Gaithersburg, MD 20899-8930, Sep. 2011, 7 pages.
(Continued)

*Primary Examiner* — Tuan A Pham
*Assistant Examiner* — Thai V Dang
(74) *Attorney, Agent, or Firm* — Christopher K. McLane

(57) ABSTRACT

The method includes monitoring a computing device for language settings during user-generated content creation and detect one or more language settings. The method further includes analyzing user-created content to detect a language from a text of the user-generated content. The method further includes compiling a list of scored preferred languages for the computing device based on the detected language settings and the detected language of the text. The method further includes intercepting a query from the computing device. The method further includes analyzing a text of the intercepted query in a plurality of selected languages based on a language setting of a user interface application, a detected language of the query, and a predetermined number of preferred languages of the computing device to produce results of analysis for each selected language. The method further includes generating a multilingual query based on the results of analysis for the selected languages.

4 Claims, 6 Drawing Sheets

(51) Int. Cl.
*G06F 16/2452* (2019.01)
*G06F 16/242* (2019.01)

(58) Field of Classification Search
USPC .......................................... 707/760
See application file for complete search history.

(56) References Cited

U.S. PATENT DOCUMENTS

| | | | |
|---|---|---|---|
| 8,442,965 B2 | 5/2013 | Lopiano | |
| 8,560,466 B2 | 10/2013 | Diao et al. | |
| 8,762,358 B2 | 6/2014 | Datta et al. | |
| 2004/0122656 A1* | 6/2004 | Abir | G06F 17/2872 |
| | | | 704/4 |
| 2006/0149716 A1* | 7/2006 | Polo-Malouvier | ............................ |
| | | | G06F 17/30554 |
| 2008/0249998 A1* | 10/2008 | Dettinger | G06F 17/30401 |
| 2013/0060748 A1* | 3/2013 | Bennett | G06F 17/2795 |
| | | | 707/709 |
| 2013/0339378 A1* | 12/2013 | Zheng | G06F 17/30669 |
| | | | 707/760 |

OTHER PUBLICATIONS

Appendix P, List of IBM Patents or Patent Applications Treated as Related, 2 pages, dated Jun. 13, 2016.

\* cited by examiner

GENERATING MULTILINGUAL QUERIES

BACKGROUND

The present techniques relate to query analysis, and more specifically, to generating multilingual queries.

Applications may generate queries and then send users to a federated database in order to retrieve data from sources. Based on the query statement, a compiler then consults the data source wrapper and the information stored on the global catalog in order to help the compiler process the query.

The compiler may retrieve information including the data source, mappings, data and server attributes, nicknames, statistics, etc. A query optimizer may facilitate the query analysis which may be part of the compiler process. Through the query optimizer, the compiler may develop different plans and alternative strategies that can be used when processing the query via the query optimizer.

SUMMARY

Embodiments of the present invention disclose a method, computer program product, and system for generating multilingual queries. In one embodiment, in accordance with the present invention, the computer-implemented method includes monitoring, by one or more computer processors, a computing device for language settings during user-generated content creation and detect one or more language settings. The method further includes analyzing, by one or more computer processors, user-created content to detect a language from a text of the user-generated content. The method further includes compiling, by one or more computer processors, a list of scored preferred languages for the computing device based on the detected language settings, and the detected language of the text. The method further includes intercepting, by one or more computer processors, a query from the computing device. The method further includes analyzing, by one or more computer processors, a text of the intercepted query in a plurality of selected languages based on a language setting of a user interface application, a detected language of the query, and a predetermined number of preferred languages of the computing device to produce results of analysis for each selected language. The method further includes generating, by one or more computer processors, a multilingual query based on the results of analysis for the selected languages.

DETAILED DESCRIPTION

Figure 1:
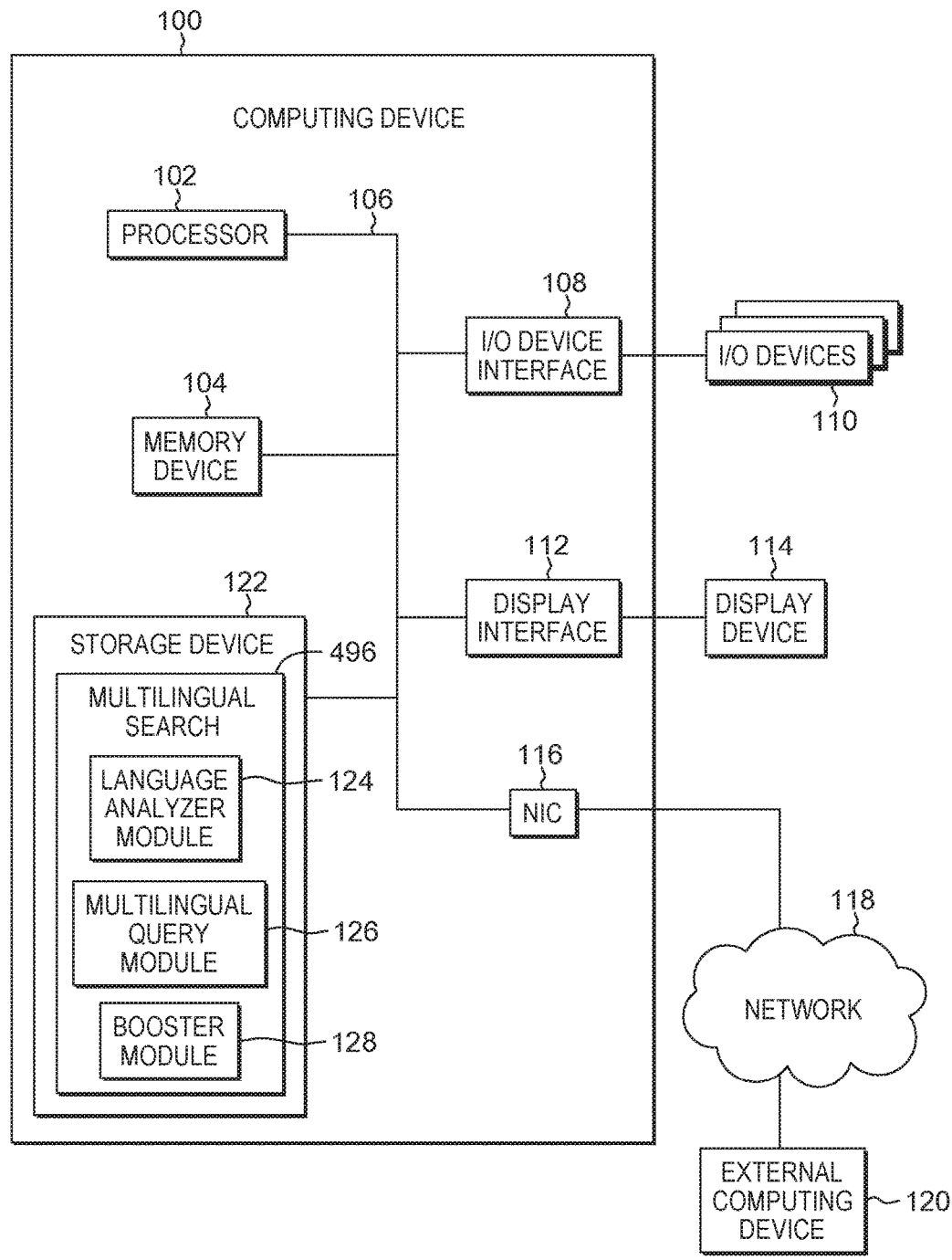
FIG. 1 depicts a block diagram of components of a computing device for generating multilingual queries, in accordance with an embodiment of the present invention.

In modern computer systems that incorporate search capabilities, it is helpful to correctly determine the language of a user's query, or the set of languages the user might be interested in searching. In some examples, a search engine can use morphological analysis of a user's search query to determine languages that a user might be interested in searching. Morphological analysis, as used herein, refers to the analysis of the structure of a given language's morphemes and other linguistic units, such as base forms, root words, affixes, parts of speech, intonations and stresses, or implied context, among others. For example, the same word written with Latin characters can have different base forms in two different European languages as well as different meanings. The rules for a morphological analysis can be different for every language. Based on the detected languages from morphological analysis, the search engine can correctly find documents that contain words which do not appear in the user's query but have the same base form as the words in the user's query. A base form, as used herein, can refer to the primary lexical unit of a word family.

However, morphological analyses performed solely based on a submitted query do not always produce accurate results. For example, a query may only have two or three words and include typos or incomplete words. Such a limited sample for analysis may produce a limited, if not incorrect, set of languages for possible results that may be of interest to a user. In addition, although the language in a browser's settings may be used, such language may not necessarily be familiar to the user. For example, users may often use a variety of locales, such as US English (EN_US) or British English (EN_UK) as a language setting in a browser while performing a query in Spanish because most of the characters are very similar. Moreover, the language character setting of a browser is generally limited to only one language at any time.

According to embodiments of the present disclosure, multilingual queries can be generated based in part on languages used to produce user-generated content. A computing device, also known as a client for the purposes of this application, can be monitored for language settings during sessions when user-generated content is produced. User-generated content provided from the client can also be analyzed to detect one or more languages from the text of the user-generated content. The detected language settings and detected language of the user-generated content text can be used to compile a list of scored preferred languages associated with a user of the client. When a user submits a query via an application, the query can be intercepted by the application. The text of the intercepted query can then be analyzed in a plurality of languages. For example, a predetermined number of languages can be selected from the list of preferred languages and the language setting of the application. Based on the results of this analysis, a multilingual query can be generated and submitted to a search engine. After the results are returned from the search engine, the multilingual query results can be displayed to the client. In some examples, boost factors based on the scores of the selected languages can also be applied to the results to affect their order. As used herein, a boost factor refers to a predetermined weight given to rankings based on factors, such as language score, among other factors. Thus, a potential advantage of the present techniques is that they can produce better quality multilingual search results that include content in languages in which a user is highly likely to be proficient. Moreover, in another potential advantage of the present techniques, by boosting query results according to their language score, the techniques enable a user to find relevant search results more efficiently. It is to be understood that some embodiments of the present techniques may not have these potential advantages and that these potential advantages are not necessarily required of all embodiments.

In some scenarios, the techniques described herein may be implemented in a cloud computing environment. As discussed in more detail below in reference to at least FIGS. 1, 3, and 4, a computing device configured to generate multilingual queries may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

With reference now to FIG. 1, an example computing device can generate multilingual queries. The computing device 100 may be, for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include processor 102 that is to execute stored instructions, memory device 104 to provide temporary memory space for operations of said instructions during operation. The processor can be a single-core processor, multi-core processor, computing cluster, or any number of other configurations. Memory device 104 can include random access memory (RAM), read only memory, flash memory, or any other suitable memory systems.

Processor 102 may be connected through system interconnect 106 (e.g., PCI®, PCI-Express®, etc.) to input/output (I/O) device interface 108 adapted to connect computing device 100 to one or more I/O devices. I/O devices 110 may include, for example, a keyboard and a pointing device, wherein the pointing device may include a touchpad or a touchscreen, among others. I/O devices 110 may be built-in components of computing device 100 or may be devices that are externally connected to computing device 100.

Processor 102 may also be linked through system interconnect 106 to display interface 112 adapted to connect computing device 100 to display device 114. Display device 114 may include a display screen that is a built-in component of computing device 100. Display device 114 may also include a computer monitor, television, or projector, among others, that is externally connected to computing device 100. In addition, network interface controller (NIC) 116 may be adapted to connect computing device 100 through system interconnect 106 to network 118. In some embodiments, NIC 116 can transmit data using any suitable interface or protocol, such as the Internet small computer system interface, among others. Network 118 may be a cellular network, a radio network, a wide area network (WAN), a local area network (LAN), or the Internet, among others. External computing device 120 may connect to computing device 100 through network 118. In some examples, external computing device 120 may be an external webserver. In some examples, external computing device 120 may be a cloud computing node.

Processor 102 may also be linked through system interconnect 106 to storage device 122 that can include a hard drive, an optical drive, a USB flash drive, an array of drives, or any combinations thereof. In some examples, the storage device may include language analyzer module 124, multilingual query module 126, and booster module 128. In some examples, language analyzer module 124 can monitor a client for language settings during user-generated content creation and detect one or more language settings. In some examples, the user-generated content can be long content. For example, long content can include wiki pages, blog posts, and web articles that are created or edited. In some examples, user-generated content can include content signed by a user. For example, an electronic signature may be used to indicate authorship of content. Language analyzer module 124 can also analyze user-created content to detect a language of a text. Language analyzer module 124 can also compile a list of scored preferred languages for the client based on the detected language settings and the detected language of the text, each preferred language having a language score calculated based on an amount of content produced in the language.

Multilingual query module 126 can then intercept a query from the client. For example, the query may be one or more words of text in any language or character set. In some examples, the query may be a web search query that includes plain text or hypertext with any number of search directives. Multilingual query module 126 may also analyze text of the intercepted query in a plurality of selected languages based on a language setting of a user interface application, a detected language of the intercepted query, and a predetermined number of preferred languages of the client to produce results of analysis for each selected language. In some embodiments, the user interface application may be a browser. The language setting of the browser may thus be used as one of the languages for analyzing the query text. For example, the predetermined number of preferred languages may be initially set at zero. The text of the intercepted query may then be analyzed based on the language setting of the user interface application, and the detected language of the intercepted query.

Multilingual query module 126 may further generate a multilingual query based on results of analysis for the selected languages. In some examples, the selected languages may include one or more of the preferred languages of the client if the query generated using the language setting of the user interface application and the detected query text language return less than a threshold number of query results. The processor may then generate a second multilingual query based upon the results of analysis for the additional selected languages. Booster module 128 may then display a list of multilingual query results in the selected languages. In some examples, booster module 128 may apply boost factors to the results of the multilingual query based on the language scores of the selected languages. For example, multilingual query results in languages that have higher language scores may be ranked higher than results that have the same relevance or popularity but have lower language scores. In some examples, the multilingual query results may be grouped by languages and ranked according to their respective language scores.

It is to be understood that the block diagram of FIG. 1 is not intended to indicate that the computing device 100 is to include all of the components shown in FIG. 1. Rather, computing device 100 can include fewer or additional components not illustrated in FIG. 1 (e.g., additional memory components, embedded controllers, modules, additional network interfaces, etc.). Furthermore, any of the functionalities of language analyzer module 124, multilingual query module 126, and booster module 128 may be partially, or entirely, implemented in hardware and/or in processor 102. For example, the functionality may be implemented with an application specific integrated circuit, logic implemented in an embedded controller, or in logic implemented in processor 102, among others. In some embodiments, the functionalities of language analyzer module 124, multilingual query module 126, and booster module 128 may be implemented with logic, wherein the logic, as referred to herein, can include any suitable hardware (e.g., a processor, among others), software (e.g., an application, among others), firmware, or any suitable combination of hardware, software, and firmware.

Figure 2:
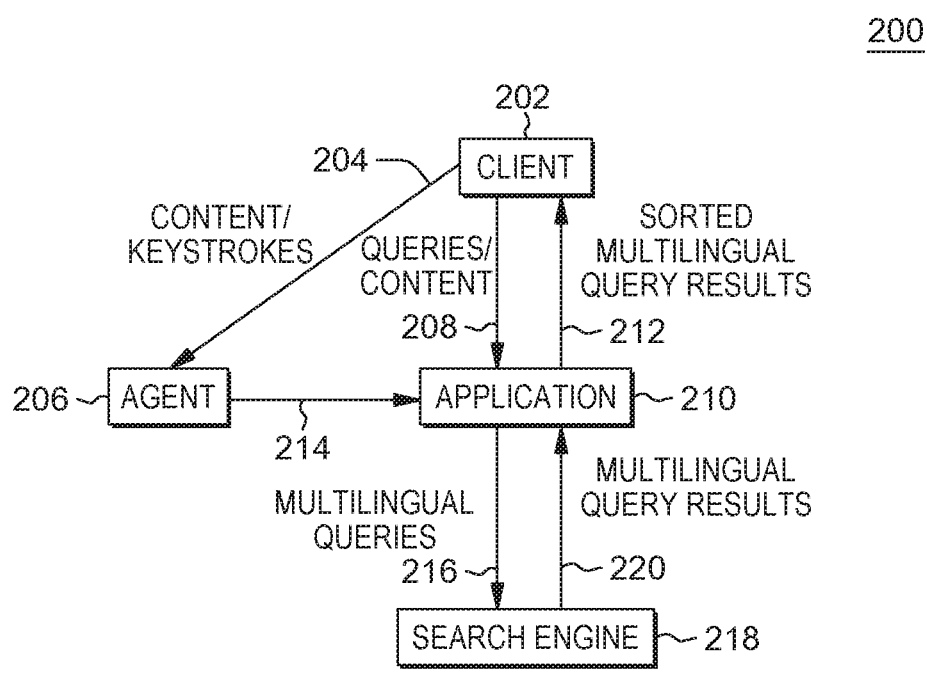
FIG. 2 is a block diagram of a system for generating multilingual queries, in accordance with an embodiment of the present invention.

FIG. 2 is a block diagram of an example system that can generate multilingual queries. The example system of FIG. 2 is generally referred to by the reference number 200.

FIG. 2 includes a client 202 that is communicatively coupled to an agent 206 as indicated by an arrow 204. The client 202 also can contain an application 210 as indicated by arrows 208 and 212. The application 210 is thus also communicatively coupled to agent 206 as indicated by arrow 214. The application 210 is also communicatively coupled to a search engine 218 as indicated by multilingual queries 216 and multilingual query results 220.

As shown in FIG. 2, agent 206 may monitor client 202 for content and/or keystrokes. For example, client 202 may be a user device or application that a user can use to produce content. In some examples, agent 206 may be software that is installed on client 202. Agent 206 may forward the installed software to application 210 for processing. Application 210 may also receive content and/or queries directly from client 202. For example, application 210 can be a social network application or any other application in which users provide user-generated content. In some examples, the user-generated content may include content that is long content. For example, long content may include wiki pages, blog posts, and web articles that are created and/or edited via application 210 or detected via agent 206 as being created and/or edited at client 202.

In some embodiments, user-generated content may also include content that is signed by electronic signatures. In some examples, the user-generated content can include short content, such as updates. Application 210 may include code to receive the content and queries from client 202 and generate multilingual queries based on the language settings of application 210, detected language of the query, and/or preferred languages as detected from analysis performed on the user-generated content. For example, analysis of user-generated content can produce a list of preferred languages with language scores based on the amount of content written in each language. In some examples, a multilingual query may be generated based on the language setting of application 210 and the detected language of the query, with additional languages added from the list of preferred languages if the resulting query returns less than a threshold number of results. The languages used in the query may be referred to as selected languages. The selected languages may be used to perform analysis of the intercepted query. For example, a morphological analysis of the intercepted query may be performed using each selected language. Each term in the intercepted query may be translated to a base form in the selected languages. A multilingual query may then be generated based on the results of analysis for the selected languages. For example, the results of each morphological analysis for each selected language may be joined by an "OR" operator to generate a multilingual query. Application 210 then submits multilingual queries 216 to search engine 218 and receives multilingual query results 220 from search engine 218.

In some examples, multilingual query results 220 generated from search engine 218 may not have a large number of results. For example, the number of results generated from search engine 218 may be less than a predefined threshold. If the number of results are less than the predefined threshold, then application 210 can perform analysis on the intercepted query using additional selected languages from the list of preferred languages. The results of this additional analysis can then be used to send an additional query and the results of the additional query combined with the results of the previous query. In some examples, the results of the additional analysis may alternatively be combined with the initial results of analysis and joined by an "OR" operator to produce a multilingual query with a greater number of languages. The results of the multilingual query from search engine 218 may then again be compared against the threshold for the number of results. Additional selected languages may be added and additional analysis may be performed on the additional selected languages until the query result threshold is met.

In some examples, once a threshold number of query results is achieved, the results may be sorted and ranked by application 210. For example, the results can be sorted by language. In some examples, the languages can be ranked by the language's language score. Boost factors can also be applied to results using the language score. The boost factors are described in greater detail in relation to FIG. 5.

It is to be understood that the block diagram of FIG. 2 is not intended to indicate that system 200 is to include all of the components shown in FIG. 2. Rather, the system 200 can include fewer or additional components not illustrated in FIG. 2 (e.g., additional dimensions, or additional indexes, etc.). For example, alternatively, or in addition to the diversity of evidence dimension, strength of the content associations and validity according to date can be used, among other dimensions. Strength of content association can include digital signatures and relative strength of authenticity. Validity according to date can include giving more weight to user-generated content that was created more recently in time.

Figure 3:
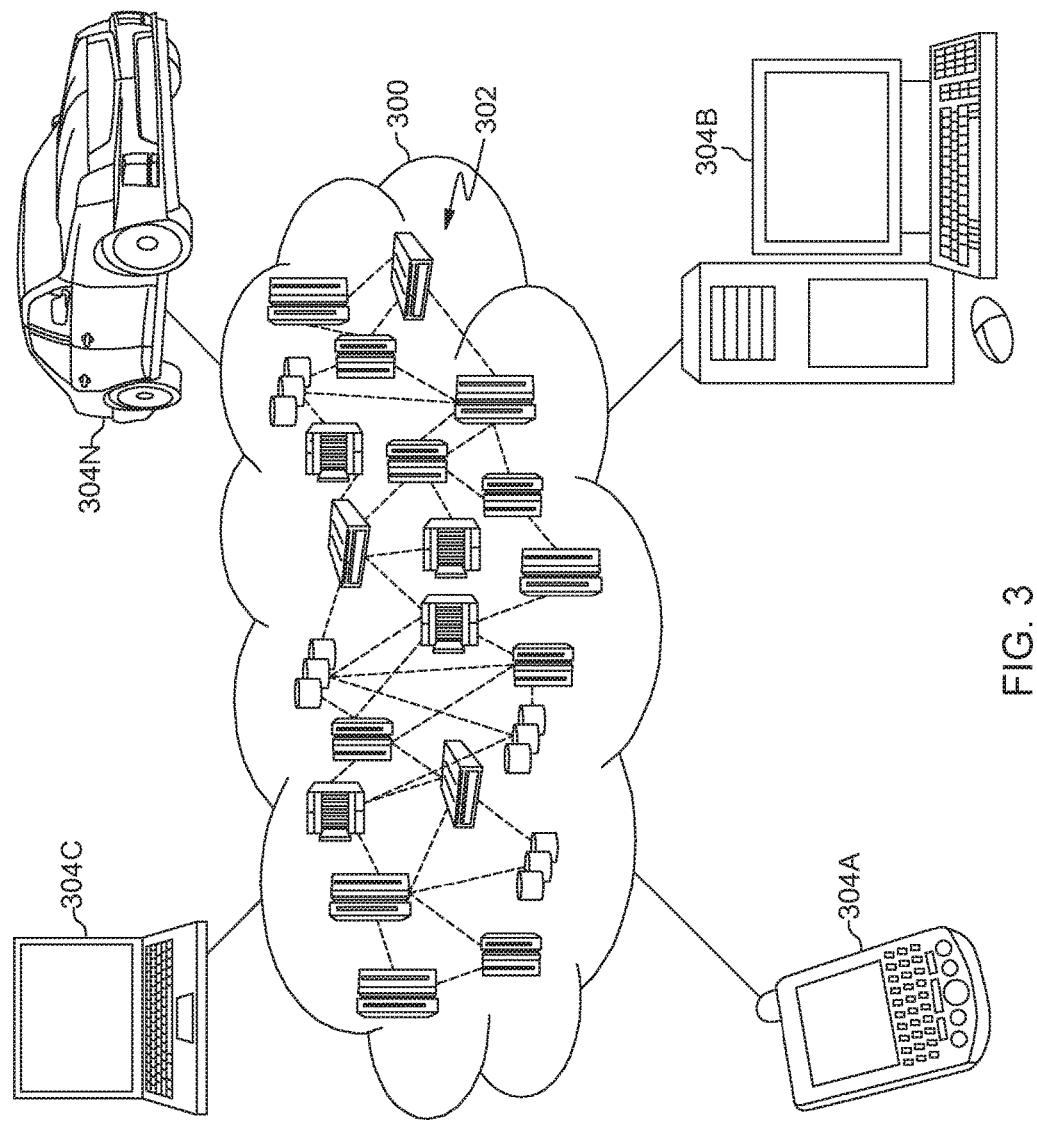
FIG. 3 is an example cloud computing environment according to embodiments described herein, in accordance with embodiments of the present invention.

Referring now to FIG. 3, illustrative cloud computing environment 300 is depicted. As shown, illustrative cloud computing environment 300 comprises one or more cloud computing nodes 302 with which local computing devices used by cloud consumers, such as, for example, personal digital assistant (PDA) or cellular telephone 304A, desktop computer 304B, laptop computer 304C, and/or automobile computer system 304N may communicate. Cloud Computing nodes 302 may communicate with one another. They may be grouped (not shown) physically or virtually, in one or more networks, such as Private, Community, Public, or Hybrid clouds as described hereinabove, or a combination thereof. This allows illustrative cloud computing environment 300 to offer infrastructure, platforms, and/or software as services for which a cloud consumer does not need to maintain resources on a local computing device. It is understood that the types of computing devices 304A-N shown in FIG. 3 are intended to be illustrative only and that cloud computing nodes 302 and illustrative cloud computing environment 300 can communicate with any type of computerized device over any type of network and/or network addressable connection (e.g., using a web browser).

Figure 4:
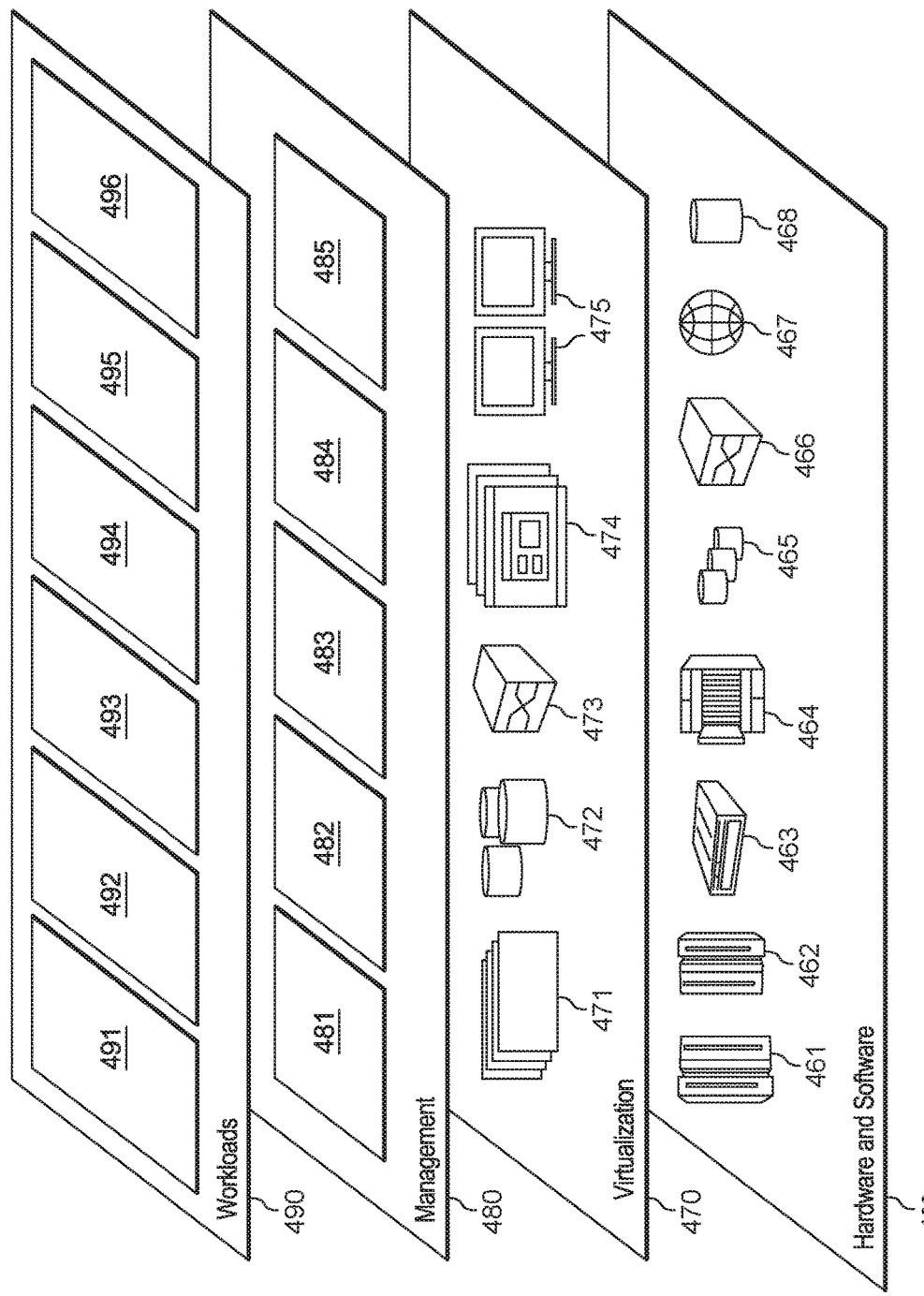
FIG. 4 is example abstraction model layers according to embodiments described herein, in accordance with embodiments of the present invention.

Referring now to FIG. 4, a set of functional abstraction layers provided by illustrative cloud computing environment 300 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include: mapping and navigation 491; software development and lifecycle management 492; virtual classroom education delivery 493; data analytics processing 494; transaction processing 495; and multilingual search 496.

Figure 5:
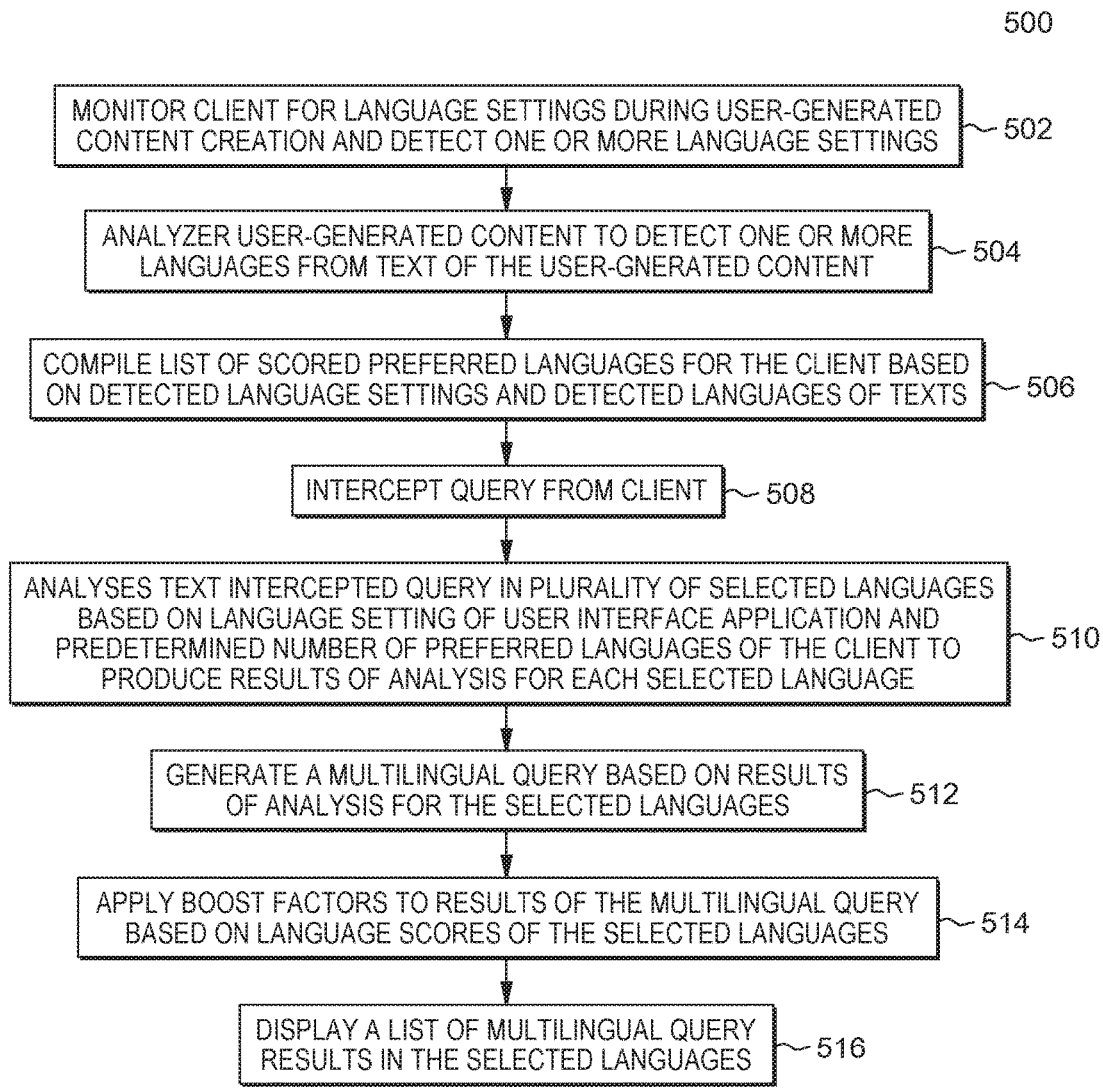
FIG. 5 is a process flow diagram depicting operational steps of a program for generating multilingual queries, in accordance with an embodiment of the present invention.

FIG. 5 is a process flow diagram of an example computer-implemented method for generating multilingual queries. The computer-implemented method 500 can be implemented with any suitable computing device, such as the computing device 100 of FIG. 1 and is described with reference to the system 200 of FIG. 2. The computer-implemented method 500 represents the operational steps to perform multilingual search 496 in workloads layer 490. Multilingual search 496 can be represented by various subprograms, modules, etc., such as language analyzer module 124, multilingual query module 126, and booster module 128.

At step 502, language analyzer module 124 monitors a client for language settings during user-generated content creation and detects one or more language settings. For example, the language settings can be detected from a word processor, a web browser, or any other application used to create content.

At step 504, language analyzer module 124 analyzes user-generated content to detect one or more languages from texts of the user-generated content. For example, any suitable language detection software can be used to detect languages. In some examples, the language analyzer module 124 can also read system language settings and the settings of the system keyboard to detect one or more languages.

At step 506, language analyzer module 124 compiles a list of scored preferred languages for the client based on detected language settings and detected languages of the texts. For example, a language score can be computed for each of the detected languages of the texts based on the amount of content in each language. The language score can indicate proficiency and usage statistics for a language. The more often the language is used, and the more content that is created using the language, the higher the language score can be. In some examples, the language score for a particular language can be based on how many distinct texts are detected in that language. The detected languages can then be listed by language score in a list of preferred languages for the client.

At step 508, multilingual query module 126 intercepts a query from the client. For example, the query can be one or more words of text in any language and/or using any character set. In some examples, the query may have been submitted via a browser and the multilingual query module 126 may be a plugin for the browser. The query can be intercepted before it is submitted to a search engine on a server for processing. In some examples, the query may have been submitted via an application, such as a social networking application, among others. The query may be intercepted at the client before the query is sent to a social networking server for processing. For example, the multilingual query module 126 can be a module added to the social networking application. In some examples, the query can also be intercepted at a server and modified to include additional language settings as described below.

At step 510, multilingual query module 126 analyzes text of the intercepted query in a plurality of selected languages based on a language setting of a user interface application and a predetermined number of preferred languages of the client to produce results of analysis for each selected language. The results of analysis can include detected base forms for each language, among other results. In some examples, analyzing the text of the query in each language can include performing a morphological analysis on the intercepted query. For example, the base form of each word for each language can be analyzed, such that other forms of each word can be queried in each selected language. In some examples, additional languages can be added to the predetermined number of preferred languages if the multilingual query results are less than a threshold. For example, if the results at step 510 are limited, then additional selected languages can be analyzed. In some examples, the predetermined number of preferred languages can start at zero and increment by one for each subsequent query until the threshold number of results is reached. In some examples, each intercepted query can be analyzed and translated into a modified query with each language from the plurality of selected languages.

At step 512, multilingual query module 126 generates a multilingual query based on results of analysis for the selected languages. In some examples, the multilingual query can be generated by joining the results of analysis for each selected language with an OR operator. For example, the modified queries can be joined together with an OR operator to form one multilingual query.

At step 514, booster module 128 applies boost factors to results of the multilingual query based on the language scores of selected languages. For example, a predetermined amount of weight can be given to results of particular selected languages based on the language score for each selected language.

At step 516, booster module 128 displays lists of multilingual query results in the selected languages. For example, the query results can be sorted by language. In some examples, the languages can be ranked according to language score. Each preferred language can have a language score calculated based on an amount of content produced in the language. In some examples, the ranking can also take into effect a relevancy score related to the search.

The process flow diagram of FIG. 5 is not intended to indicate that the operations of computer-implemented method 500 are to be executed in any particular order or that all of the operations of computer-implemented method 500 are to be included in every case. Additionally, computer-implemented method 500 can include any suitable number of additional operations.

The present techniques may be a system, a computer-implemented method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of computer-implemented methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
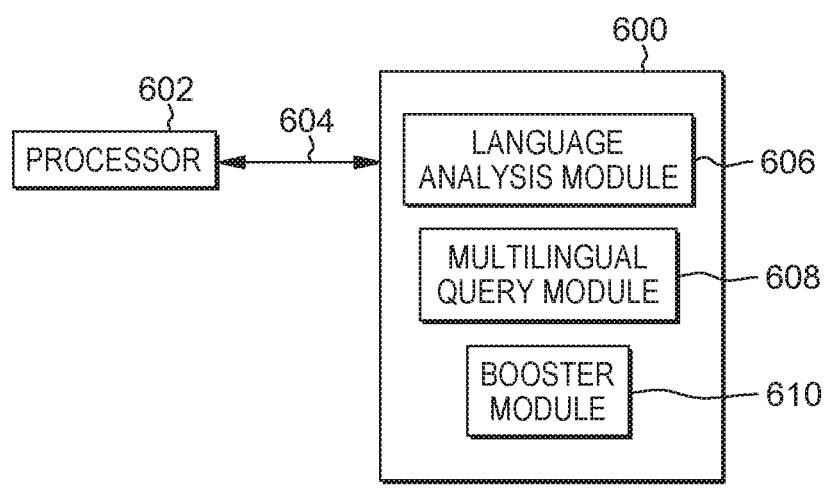
FIG. 6 is a block diagram illustrating computer-readable medium that can generate multilingual queries, in accordance with an embodiment of the present invention.

Referring now to FIG. 6, a block diagram is depicted of an example computer readable medium 600 that can generate multilingual queries. Computer readable medium 600 may be accessed by processor 602 over computer interconnect 604. Computer readable medium 600 also represents one embodiment of multilingual search 496. Furthermore, computer readable medium 600 may include code to direct processor 602 to perform the operations of the current computer-implemented method.

The various software components discussed herein may be stored on computer readable medium 600, as indicated in FIG. 6. For example, language analysis module 606 includes code to monitor a client for language settings during user-generated content creation and detect one or more language settings. Language analysis module 606 also includes code to analyze user-created content to detect a language of a text of the user-generated content. Language analysis module 606 also includes code to compile a list of scored preferred languages for the client based on the detected language settings and the detected language from a text of the user-generated content. Language analysis module 606 can calculate a language score for each preferred language based on an amount of content produced in the preferred language. For example, if 52 articles were produced in Spanish and 26 articles were produced in English, then Spanish would have a higher language score than English. Multilingual query module 608 includes code to intercept a query from the client. Multilingual query module 608 also includes code to analyze a text of the intercepted query in a plurality of selected languages based on a language setting of a user interface application and a predetermined number of preferred languages of the client to produce results of analysis for each selected language. Multilingual query module 608 includes code to generate a multilingual query based on results of analysis for the selected languages. Booster module 610 includes code to display a list of multilingual query results in the selected languages. Booster module 610 also includes code to apply a boost factor to the results of the multilingual query based on scores of selected languages.

In some examples, booster module 610 may sort the multilingual query results by language. The selected languages can be ranked by language score. Multilingual query module 608 can further include code to add additional languages to the predetermined number of preferred languages if the multilingual query results are less than a threshold in number. In some examples, language analysis module 606 can include code to perform a morphological analysis on the intercepted query. In some examples, multilingual query module 608 can include code to generate the multilingual query comprising by joining the results of analysis for each selected language with an OR operator.

The flowchart and block diagrams in the Figures illustrate the architecture, functionality, and operation of possible implementations of systems, computer-implemented methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 6 may be included within computer readable medium 600, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating multilingual queries, the method comprising:

detecting, by one or more computer processors, one or more language settings during user-generated content creation prior to an Internet browser query;

analyzing, by one or more computer processors, user-created content to detect a language from a text of the user-generated content prior to the Internet browser query;

compiling, by one or more computer processors, a list of scored preferred languages for the computing device based on the detected language settings and the detected language of the user-created content prior to the Internet browser query;

subsequent to compiling a list of scored preferred languages, intercepting, by one or more computer processors, the Internet browser query from the computing device;

analyzing, by one or more computer processors, a text of the intercepted query in a plurality of selected languages based on a language setting of a user interface application, a detected language of the query, and a predetermined number of preferred languages of the computing device to produce results of analysis for each selected language;

generating, by one or more computer processors, a multilingual query based on the results of analysis for the selected languages;

adding, by one or more computer processors, additional languages to the predetermined number of preferred languages in response to determining that the multilingual query results are less than a threshold, wherein the predetermined number of preferred languages begins at zero and increases by increments of one for each subsequent query until the threshold number of results is reached; and displaying, by one or more computer processors, a list of multilingual query results in the selected languages, wherein each selected language has a language score calculated based on an amount of content produced in the selected language.

2. The method of claim 1, further comprising:

applying, by one or more computer processors, boost factors to the multilingual query results based on the language scores of the selected languages.

3. The method of claim 1, wherein analyzing the text of the intercepted query further comprises performing, by one or more computer processors, a morphological analysis on the intercepted query.

4. The method of claim 1, wherein generating the multilingual query comprises joining, by one or more computer processors, the results of analysis for each selected language with an OR operator.

* * * * *